United States Patent [19]

Ludwig et al.

[11] Patent Number: 5,339,593
[45] Date of Patent: Aug. 23, 1994

[54] ARRANGEMENT FOR REINFORCING PARTS OF A WALL WITH A HARDENABLE MASS

[75] Inventors: Wolfgang Ludwig, Schwabmünchen; Armin Hoffmann, Landsberg/Lech, both of Fed. Rep. of Germany

[73] Assignee: Hilti Aktiengesellschaft, Fürstentum Liechtenstein, Fed. Rep. of Germany

[21] Appl. No.: 974,859

[22] Filed: Nov. 10, 1992

[30] Foreign Application Priority Data

Nov. 11, 1991 [DE] Fed. Rep. of Germany ....... 4136961

[51] Int. Cl.⁵ .................. E04B 1/41; E04G 21/00; F16B 39/02
[52] U.S. Cl. ........................... 52/707; 411/82
[58] Field of Search .................. 52/704–707, 52/744; 411/82, 258; 405/258, 260

[56] References Cited

U.S. PATENT DOCUMENTS

| | | | |
|---|---|---|---|
| 4,355,933 | 10/1982 | Fischer | 52/744 |
| 4,790,114 | 12/1988 | Falco | 52/707 |
| 5,007,780 | 4/1991 | Hoffman et al. | 52/707 |

Primary Examiner—James L. Ridgill, Jr.
Attorney, Agent, or Firm—Anderson Kill Olick & Oshinsky

[57] ABSTRACT

A device for reinforcing a rear surface of a wall includes a receiving bag (4) attached to one end of an axial extending filling stub (1). Webs (3) are attached to the receiving bag (4) and the filling stub (1) so that the webs and receiving bag can be folded from a radially outwardly extending position toward the axis of the filling stub whereby the receiving bag and the webs can be folded into a position so that the combination of the webs (3), the receiving bag (4) and the one end of the stub (1) can be inserted through an opening (6a) in the wall (6). In the inserted position, the webs (3) return to the radially outwardly extending position along with the receiving bag (4) and the bag is filled with a hardenable mass (7) through the filling stub (1). A fixing element (5) is inserted between radially and circumferentially extending ribs (2) on the filling stub (1) located on the opposite side of the wall from the receiving bag (4). The fixing element (5) limits the depth that the filling stub (1) is inserted through the wall. After the mass (7) has hardened, a part of the wall (6) is reinforced at its rear surface by the mass, and fastening elements, such as screws, nails and the like, can be inserted through the wall into the hardened mass.

4 Claims, 3 Drawing Sheets

ARRANGEMENT FOR REINFORCING PARTS OF A WALL WITH A HARDENABLE MASS

BACKGROUND OF THE INVENTION

The present invention is directed to a device for reinforcing parts of a wall using a hardenable or curable mass, where the mass is introduced through a tubular-shaped filling or insertion stub extending through an aperture in the wall from a front surface to a rear surface. At the rear surface, the mass is fed into a receiving bag. An adjustable depth stop is engageable on the filling stub on the front surface of the wall. The receiving bag is shaped to provide a large area extending generally perpendicularly to the axis of the filling stub and bearing against the rear surface of the wall.

Anchors at parts of thin walls, such as gypsum wall board panels, are established with attachment means based either on area-wise contact pressure or on reinforcement of the wall with the use of hardenable or curable masses. Where a hardenable mass is used, better conditions for the anchors are created, particularly at the rear surface of the wall. Since local area-wise contact pressure frequently causes breakouts or destruction of a part of the wall, the use of such an attachment means is limited. On the other hand, the effective metered application of the hardenable mass to the rear surface of the wall in a limited area generally requires a considerable technical effort.

In DE-OS 39 12 526 an attachment element is disclosed constructed of parts displaceable in a telescope-like manner for applying a specific volume of a hardenable mass to the rear surface of a specific part of a wall. Accordingly, a single effectively operating attachment point for anchoring means is created, where the force application occurs at the anchoring means itself.

SUMMARY OF THE INVENTION

Therefore, the primary object of the present invention is to provide a simple and easily handled device which in practice results in reinforcing or strengthening the rear surface of parts of a wall, so that a number of fastening elements, such as screws, nails, dowels or the like, can be received in the reinforced region. In accordance with the present invention, one part of a receiving bag for the hardenable mass is formed of a gauze surface facing the rear surface of the wall and another part of a foil surface facing away from the rear surface of the wall with the foil being impermeable to the mass delivered into the bag. Further the receiving bag is connected to the filling stub by elastic webs which can be folded from a position extending radially from the stub into a position extending parallel with the axial direction of the stub.

The hardenable mass directed into the receiving bag flows through the gauze surface abutting the rear surface of the wall and enters into direct contact with the rear surface, whereby a compact or sturdy connection is formed after the mass cures or hardens. As the receiving bag is filled with the hardenable mass, the webs, preferably attached to the sides of the filling stub and connected to the receiving bag, aid in the reinforcement of the wall part, since the webs are elastically deformable and can be folded toward the axis of the stub during installation, while the webs, after installation, bear against the rear surface of the wall after passing through an opening in the part of the wall to be reinforced, thereby assuring a secure attachment after the mass is cured or hardened.

In a preferred arrangement, the webs extend approximately for half of the radial dimension of the receiving bag, and such dimension is sufficient to stiffen the receiving bag during installation, so that it can be inserted through the opening in the wall.

Another helpful feature of the invention is a depth stop which can be introduced between circumferentially extending ribs disposed transversely of the axis of the filling stub. Preferably, the depth stop is configured as a U-shaped fixing element with a thickness corresponding to the spacing between two adjacent ribs. Accordingly, the filling stub can be retained and aligned in any position during installation and different wall thicknesses can be taken into account.

To form a planar or flat front surface on the reinforced part of the wall, the portion of the filling stub projecting from the front surface can be severed with the help of the depth stop. Accordingly, the inside of the depth stop is provided with a sharp edge in the region of the bight part of the U-shaped stop.

The attachment process at the part of the wall reinforced with the hardenable mass is achieved by screws, nails, dowels or the like without any required predrilling. As a result, attachment at thin parts of a wall can be carried out rapidly and economically by a simple device for introducing hardenable or curable masses into contact with a rear surface of the wall.

Finally, in actual practice, installation assists such as tubes, sheaths, or jackets can be utilized for facilitating and simplifying the passage of the receiving bag through the opening in the wall.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
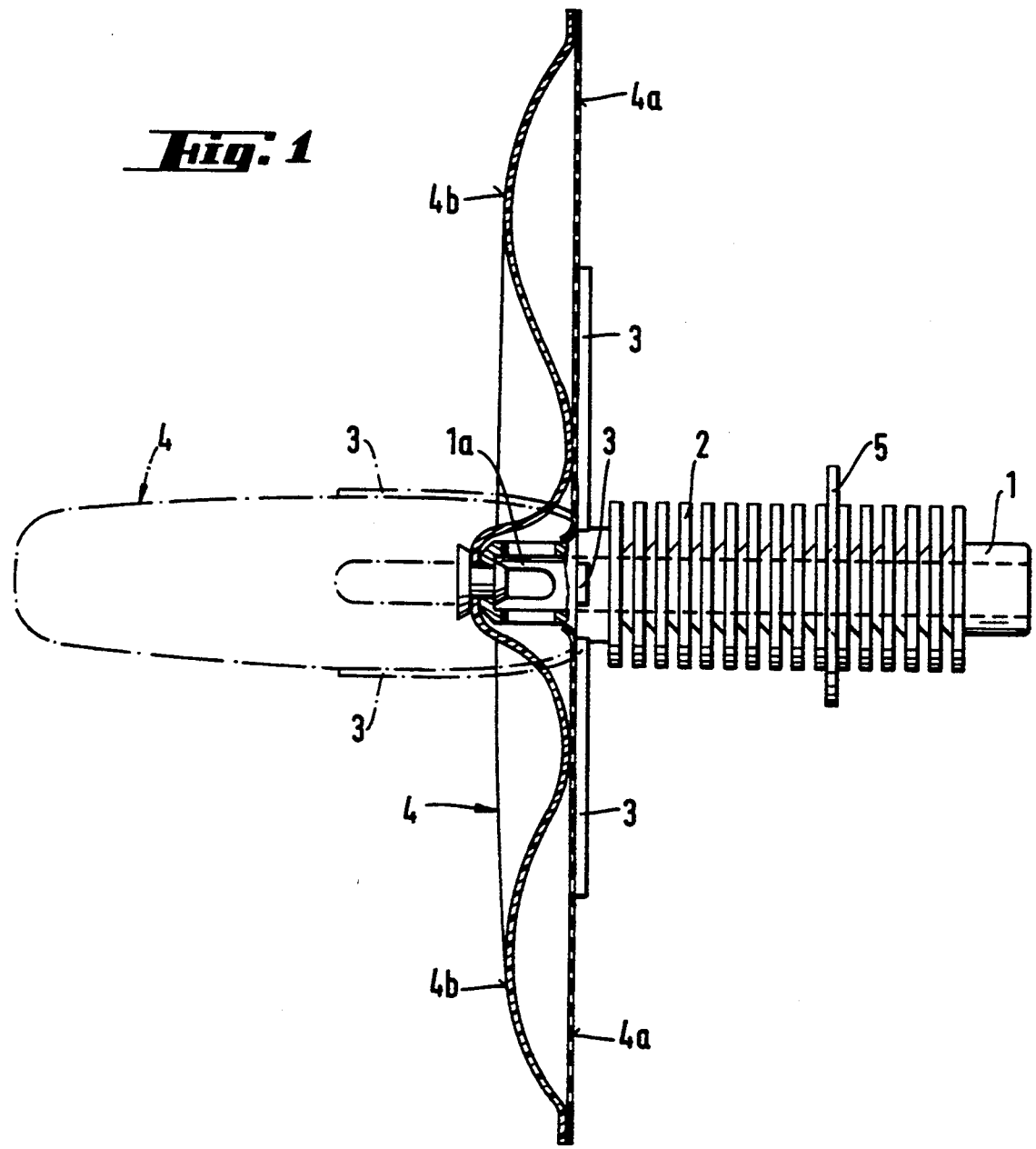
FIG. 1 is a side view of a device embodying the present invention prior to its insertion through an opening in a wall.
Figure 2:
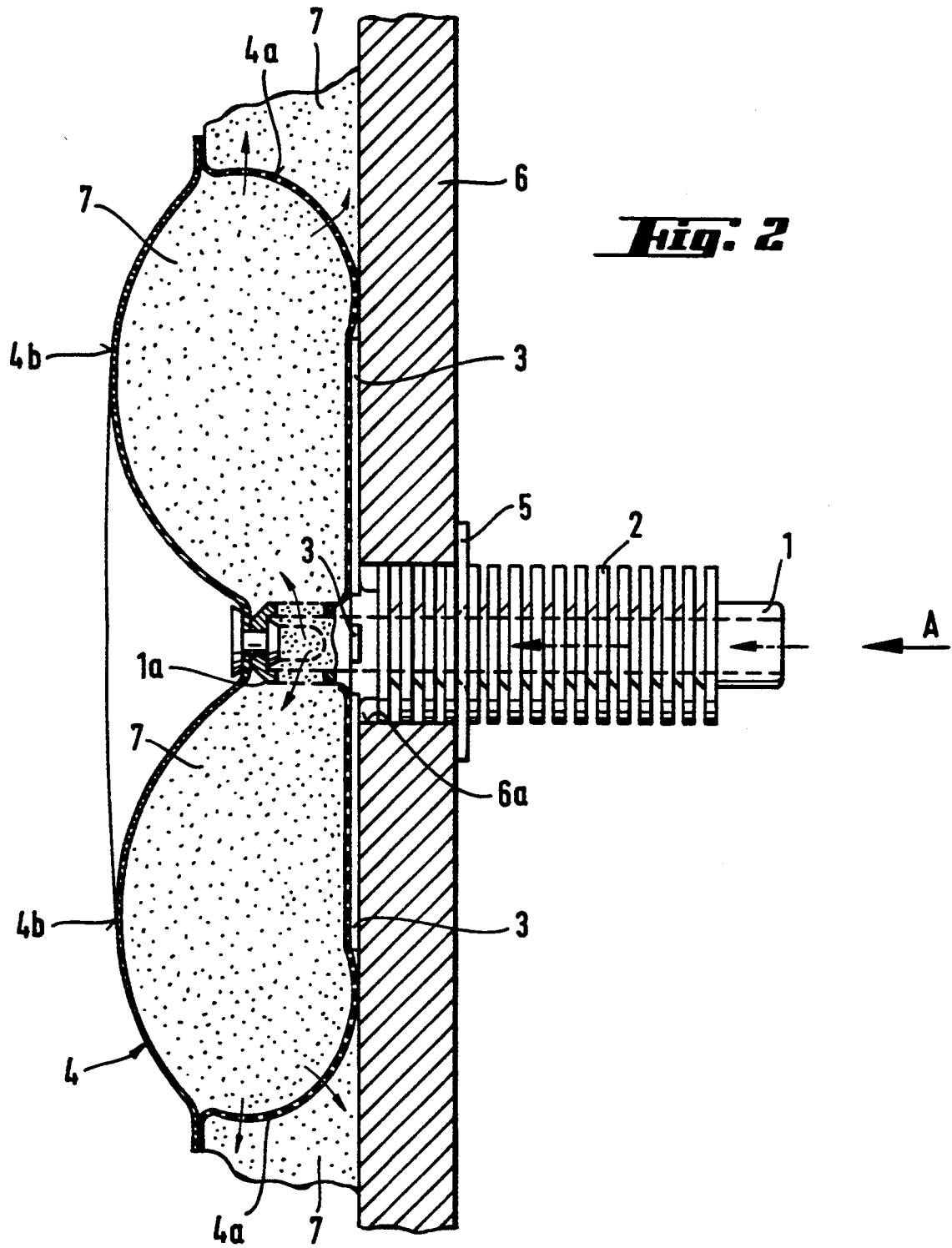
FIG. 2 is a side view of the device shown in FIG. 1, illustrated partially in section, inserted through a wall and with the hardenable mass inserted into a receiving bag.

As shown in FIGS. 1 and 2, the device includes an axially extending tubular-shaped filling or insertion stub 1 with axially spaced circumferentially extending ribs 2 arranged transversely of the stub axis. The filling stub 1 has a first end at the right hand end and a second end at the left hand end in FIGS. 1 and 2. Flexible webs 3 are connected to the filling stub 1 adjacent the second end 1a. The webs 3 can be folded over towards the axis of the filling stub 1 so that they extend generally parallel with the axis. Note in FIG. 1 the webs 3 are shown in dashed lines extending generally parallel to the axis of the stub 1. A receiving bag 4 is connected to the filling stub 1 at its second end 1a and also to the webs 3. The receiving bag extends radially outwardly from the stub 1. Receiving bag 4 is formed of a gauze surface 4a and a foil surface 4b impermeable to the hardenable mass. Gauze surface 4a is arranged on the side facing the first end of the stub 1, that is, the gauze surface faces to the right in FIGS. 1 and 2. The foil surface 4b faces in the opposite direction, that is, away from wall 6.

As shown in FIG. 1, the receiving bag 4 along with the webs 3 can be folded from the position shown in full line toward the extension of the axis of the stub 1 with the webs 3 and the receiving bag 4 assuming the form shown in phantom lines in FIG. 1. In this inwardly folded position, the receiving bag 4 and the webs 3 can be inserted through an opening 6a in a part of wall 6, note FIG. 2. The wall 6 has a front surface facing to the right in FIG. 2 and a rear surface facing to the left. After passing through the opening 6a from right to left with the receiving bag 4 and the webs located on the rear surface side of the wall 6, the webs can return to the original positions as shown in FIG. 1 with the receiving bag also opening from the folded position so that the gauze surface 4a rests against the rear surface of the wall 6.

Figure 3:
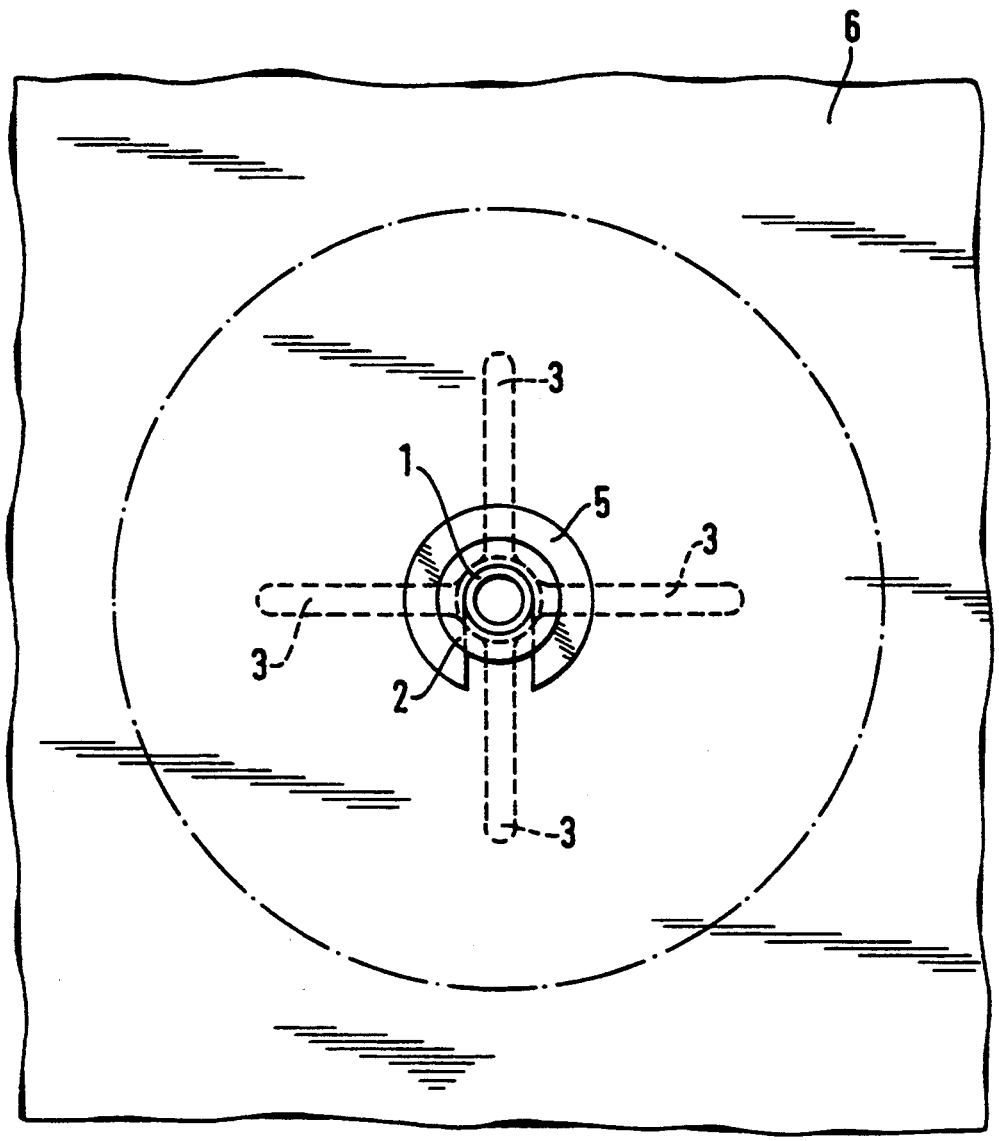
FIG. 3 is an elevational view of the device viewed in the direction of the arrow in FIG. 2.

As shown in FIGS. 1 and 2 and particularly in FIG. 3, a U-shaped fixing element 5 projecting radially outwardly from the ribs can be inserted between two adjacent circumferential ribs 2, so that the fixing element 5 serves as a depth stop, note FIG. 2. Preferably, the fixing element 5 is inserted only after the passage of the second end of the stub 1 through the opening 6a and the fixing element is placed between two ribs as close as possible to bearing against the front surface of the wall 6. In this position of the fixing element 5, the filling stub 1 cannot penetrate any further into the opening 6a. This fixed position is especially of great importance when the receiving bag 4 is filled with a hardenable mass 7 as displayed in FIG. 2. When the receiving bag 4 is filled with the hardenable mass, initially the mass 7 fills the receiving bag and flows through the gauze surface 4a against the rear surface of the wall 6 and effects a strengthening or reinforcing with the generation of pressure between the rear surface of the wall 6 and the receiving bag. With this generation of pressure, the fixing element 5, acting as a depth stop, is of particular importance. The foil surface 4b of the receiving bag 4, since it is impermeable, aids in directing the hardenable mass 7 against the rear surface of the wall 6.

The configuration of the U-shaped fixing element 5 can be seen in FIG. 3 along with the arrangement of the webs 3 shown in dashed lines, note that there are four webs and they extend radially outwardly relative to the filling stub 1.

After the mass 7 has hardened or cured, the device has achieved its final position and the filling stub 1 is locked in position. Since the filling stub 1 has no further function, its portion projecting outwardly from the front surface of the wall 6 can be severed, for instance, by the fixing element 5 which can be provided with a sharp edge on its radially inner surface to provide the severing action, whereby it acts as a cutting tool. In the entire region of the wall 6 backed and reinforced by the hardened mass 7, fastening elements, such as screws, nails and the like, can be attached when the hardening step has been completed. The entire region of the hardened mass 7 has a circular shape as indicated by the dashed lines in FIG. 3 and this region is available for receiving fastening elements. It can be noted in FIG. 2 that the hardenable mass passes through the gauze surface 4a and contacts the rear surface of the wall 6.

While a specific embodiment of the invention has been shown and described in detail to illustrate the application of the inventive principles, it will be understood that the invention may be embodied otherwise without departing from such principles.

We claim:

1. A device including a wall for using a hardenable or curable mass (7) to reinforce a portion of the wall (6), the wall (6) having a front surface side and an oppositely facing rear surface side, wherein the device comprises an axially extending tubular filling stub (1) arranged to extend through an opening (6a) in the wall (6) from the front surface side to the rear surface side, said filling stub having a first end arranged to be spaced outwardly from the front surface side and a second end arranged to be spaced outwardly from the rear surface side, a receiving bag (4) located on the second end of the filling stub for receiving the hardenable mass (7) through the filling stub (1) on the rear surface side, a depth stop (5) engageable on the filling stub (1) adjacent the front surface side of said wall (6), said receiving bag (4) is shaped to extend radially outwardly from and transversely of the axial direction of said filling stub (1) on the rear surface side of said wall, wherein the improvement comprises that said receiving bag (4) has a first surface (4a) arranged to face the rear surface side of said wall and a second surface (4b) arranged to face outwardly away from the rear surface side, said first surface is formed of a gauze permeable to the mass to be filled through the filling stub (1) into the receiving bag (4) and the second surface (4b) is formed of a foil impermeable to the mass to be filled into the receiving bag, and elastic webs (3) spaced angularly apart and connecting the first surface (4a) of the receiving bag to the filling stub, and said webs (3) being foldable from a first position extending radially outwardly from said filling stub (1) between and in contact with the first surface of said receiving bag and the rear surface side of said wall to a second position extending generally parallel to the axis of said filling stub whereby said webs extend generally in the axial direction of the filling stub for inserting the second end of the filling stub through the wall opening from the front surface side to the rear surface side thereof and then being displaceable into the first position extending radially outwardly from the filling stub with the receiving bag extending radially outwardly from the filling stub so that the bag is ready to receive the hardenable mass and reinforce the rear surface of an adjacent portion of said wall (6).

2. A device, as set forth in claim 1, wherein said receiving bag extends radially outwardly from a circumference of said filling stub (1) and said webs (3) extend approximately for half the radial dimension of the receiving bag (4).

3. A device, as set forth in claim 1 or 2, wherein the filling stub has circumferentially extending ribs spaced apart in the axial direction and extending radially outwardly therefrom and arranged to be located outwardly from the first surface side of said wall.

4. A device, as set forth in claim 3, wherein a U-shaped fixing element (5) is insertable between adjacent said ribs (2) on the filling stub (1) and forms a depth stop and severing means for the filling stub (1).

* * * * *